United States Patent

Stemmer

[11] Patent Number: 5,181,367
[45] Date of Patent: Jan. 26, 1993

[54] METHOD AND APPARATUS FOR INSERTING SLIDE FRAMES OR FILM STRIPS INTO THE POCKETS OF A FILM JACKET

[75] Inventor: Gottfried Stemmer, Garmisch-Partenkirchen, Fed. Rep. of Germany

[73] Assignee: Geimuplast Peter Mundt GmbH & Co. KG, Farchant, Fed. Rep. of Germany

[21] Appl. No.: 770,574

[22] Filed: Oct. 3, 1991

[30] Foreign Application Priority Data

Sep. 24, 1990 [DE] Fed. Rep. of Germany ....... 4030198
Feb. 8, 1991 [DE] Fed. Rep. of Germany ....... 4103910

[51] Int. Cl.[5] .................. B65B 41/18; B65B 57/06; B65B 5/04
[52] U.S. Cl. .......................... 53/473; 53/51; 53/284.2
[58] Field of Search ............... 53/435, 455, 473, 475, 53/469, 51, 284.2, 64, 67, 520

[56] References Cited

U.S. PATENT DOCUMENTS

| | | | |
|---|---|---|---|
| 2,269,532 | 1/1942 | Howard | 53/64 X |
| 3,896,603 | 7/1975 | Tout | 53/284.2 X |
| 4,680,205 | 7/1987 | Lerner et al. | 53/51 X |
| 4,787,766 | 11/1988 | Lörsch | 53/520 X |
| 4,876,842 | 10/1989 | Ausnit | 53/64 X |
| 4,974,394 | 12/1990 | Suzuki | 53/51 X |
| 4,995,221 | 2/1991 | Stemmer, Jr. | 53/455 |
| 5,067,307 | 11/1991 | Francioni et al. | 53/51 X |

Primary Examiner—Horace M. Culver
Attorney, Agent, or Firm—Morgan & Finnegan

[57] ABSTRACT

A method for inserting slide frames (17, 21) or film strips in the pockets (10) of a two-layer film jacket (2) which is open on one side (14). The pockets (10) are partitioned from each other by transverse seams (6), preferably transverse weld seams. One or several slide frames (17, 21) are successively inserted into a pocket (10), or a film strip is inserted into a pocket (10). The film jacket (2) is then transported in the longitudinal direction (12) of the film to the next pocket (10) to be filled. In order to simplify such a method, during the further transport of the film jacket (2) for the positioning of the next pocket (10) to be filled, the position of the next transverse seam (6) is detected by a feeler (1) which is moved in between the film layers (11, 13) at the open side (14) of the film jacket (2). The feeler (1) is movable in longitudinal direction in a direction (18) parallel to the transverse weld seams (6) and is provided with a wedge surface (19) at its end moving into the film (2). A switch (4) can also be provided which is activated by the feeler (1).

13 Claims, 2 Drawing Sheets

METHOD AND APPARATUS FOR INSERTING SLIDE FRAMES OR FILM STRIPS INTO THE POCKETS OF A FILM JACKET

BACKGROUND OF THE INVENTION

1. Field of the Invention

The present invention relates to a method for inserting slide frames or film strips into the pockets of a two-layer film jacket open on one side, the pockets being partitioned from each other by transverse seams, preferably transverse weld seams, and to an apparatus for carrying out said method.

2. Description of Prior Art

Methods for inserting slide frames into the pockets of a film jacket are known from the German laid-open print 37 08 880 (see corresponding U.S. Pat. Nos. 4,848,576 and 4,995,221) and from the published European patent application 228 536. In the known methods, slide frames are inserted into the pockets of a two-layer continuous film jacket being open on one side, said pockets being partitioned from each other by transverse weld seams. The pockets extend in the transverse direction of the film. Each pocket is adapted to receive several slide frames successively. The slide frames are successively pushed through the opening at one side of the film jacket. Each pocket is provided with apertures in one of the two films, which are arranged at a distance corresponding to that of the slides so that each slide can be taken out thereof individually. The details are described in the German laid-open print 37 08 880; reference is explicitly made to said prepublication (the disclosures of U.S. Pat. Nos. 4,848,576 and 4,995,221 are incorporated herein by reference). After the filling of a pocket, the film jacket is transported further in the longitudinal direction of the film, i.e. transversely to the direction of the pockets, to the next pocket to be filled. I.e., the film jacket is transported by a distance corresponding to the distance between the pockets. For permitting an exact positioning of the next pocket to be filled, in the known solution, identification marks are imprinted consisting of colored, e.g. black, bars. Said marks are detected by an optical sensor. The marks are arranged spaced apart from each other at the distance of the pockets. They can, for instance, respectively align with a transverse weld seam.

German utility model 72 24 072 discloses a method for inserting film strips into the pockets of a film jacket, which is operated in substantially the same manner. The difference lies only in the fact that, instead of slide frames, film strips are inserted into the pockets of the film jacket.

Hence, in the known solutions the positioning of the film jacket is controlled by means of imprinted marks which are applied to the individual pockets at a constant distance. The film jacket is transported further after the filling of a pocket until the optical scanning device detects the location of the next mark and thus of the next pocket.

Disadvantageously, in the known methods, there exist unavoidable process tolerances between the layers of the pockets and the marks. The application of marks is only possible within certain unavoidable process tolerances. Furthermore, the printing process represents an additional work cycle. Consequently, in addition to producing the pockets, the imprinted marks also have to be produced in a separate work cycle. Finally, also, the imprinting of the film is difficult. In case of a too low degree of application of color, there may be problems in detecting the color marks and thus in positioning the film jacket.

From the German published examined application 21 66 340, there is known a feed device for a film web having a sequence of pockets. This feed device feeds the pockets to a work station so that they are suitably positioned. In the feed direction prior to the work station, there is provided a cam which is reciprocably movable in parallel to the feeding direction. The cam engages with the pockets during advancing and is pivotable out of engagement during retraction. To permit wrinkle-free advancing of a flat pocket band consisting of soft film in such an apparatus, a friction band is provided for advancing a pocket made of a longitudinally folded film web by means of transverse connections. The friction band is arranged between the cam acting upon the transverse connections and the work station. The friction band acts upon the pocket band. In the advance cycle, it can be driven at a higher speed than the cam. The tensile force transmitted from the friction band to the pocket band under slip is smaller than the force required for advancing the pocket band. In the German published examined application 21 66 340 the cam is not used for detecting the position of the next transverse connection in the film web but for advancing the film web by one pocket width, i.e. for bringing the next pocket of the film web in the working position.

SUMMARY OF THE INVENTION

It is the object of the present invention to provide a simplified method and apparatus for inserting slide frames or film strips into the pockets of a film jacket.

According to the invention this object is solved by the fact that the position of the next transverse seam is detected during the transport of the film jacket for positioning the next pocket to be filled. According to the invention, no mark is required on the film jacket, and the position of the pockets is directly scanned. Thereby the drawbacks described above are avoided.

The position of the next transverse seam is scanned by a feeler. Said feeler can be moved in between the film layers at the open side of the film jacket. The feeler can detect or scan that side of the transverse seam being the forward one in the transport direction of the film. But it can also detect or scan that side of the transverse seam being the trailing one in the transport direction of the film. Furthermore it is also possible to detect or scan that end of the weld seam which faces the open side of the film jacket, i.e. the so-called narrow end or the so-called small side of the weld seam. The transverse seam or transverse weld seam can also have a special form facilitating the scanning. The "weld seam" can consist of two spaced apart parallel weld seams lying close to each other, so that, if necessary, a cut can be carried out between said two weld seams. When the film is severed between the two adjacent weld seams (or within a relatively wide weld seam), the pockets are still closed on both sides.

In an apparatus for carrying out a method for inserting slide frames or film strips into the pockets of a film jacket, the above-indicated object is achieved by a scanning device for detecting the position of the transverse seam of the next pocket to be filled of the film jacket during the transport of the film jacket.

The scanning device is provided with a feeler. The feeler can be moved in between the film layers at the open side of the film jacket.

It is possible for the feeler to detect the side of the transverse seam being the forward one in transport direction of the film. But the feeler can also detect the side of the transverse seam being the trailing one in transport direction of the film. Furthermore, by the feeler there can also be scanned the acute or small side of the weld seam. According to a further advantageous development, the feeler is adapted to be used for scanning of a special form of the weld seam.

The feeler can be movable in the longitudinal direction. Advantageously, the feeler is movable in longitudinal direction in direction of the pockets, i.e. in a direction transverse to the transport direction of the film. Bit it is also possible that the feeler be pivotally movable around a point of rotation.

The feeler can have a wedge surface. Said wedge surface can act upon that end of the weld seam which faces the open side of the film jacket, i.e. upon the so-called narrow end or the so-called small side of the weld seam. By the action of the wedge surface on said end of the weld seam, the feeler is displaced or pivoted. The narrow end of the weld seam can have a semicircular form. But it can also be acute in order to constitute a feeding funnel for the slide frames or the film strips.

Advantageously, there is provided a switch which can be actuated by the feeler. Said switch controls the movement of the film jacket in a manner that the further transport of the film jacket is stopped on actuation of the switch.

An embodiment of the invention described in the following section with reference to the accompanying drawings.

DETAILED DESCRIPTION OF PREFERRED EMBODIMENTS

Figure 1:
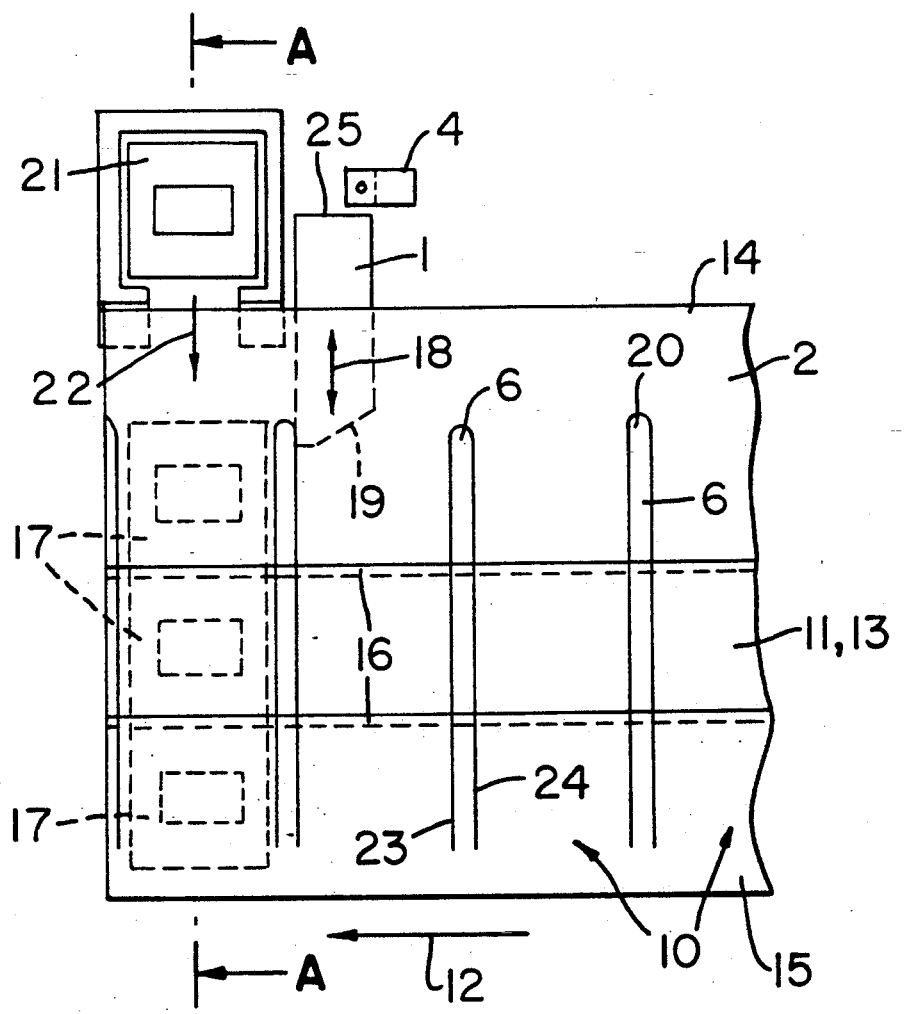
FIG. 1 shows a top view of a film jacket in an apparatus for inserting slide frames into the pockets of the film jacket, with a scanning device.

FIG. 1 shows a film jacket 2 with a plurality of transverse pockets 10 which are partitioned from each other in the longitudinal direction 12 of the film by transverse weld seams 6. The film jacket 2 is described in detail in the German laid-open print 37 08 880 (corresponding to U.S. Pat. Nos. 4,848,576 and 4,995,221); which references are incorporated herein by reference. The film jacket 2 consists of two layers 11, 13 arranged on top of each other, i.e. a bottom layer 13 and a top layer 11. On the filling side 14 the film jacket 2 is open, on the opposite side 15 it is closed. The film jacket 2 is made by the folding of a single layer.

The transverse weld seams 6 are shorter than the film width; thus, they respectively end before the sides 14 and 15 of the film jacket 2.

At its surface 11, each pocket 10 is provided with apertures 16 arranged at the distance of the slide frames 17 so that each frame can be taken out of the pocket separately.

Figure 2:
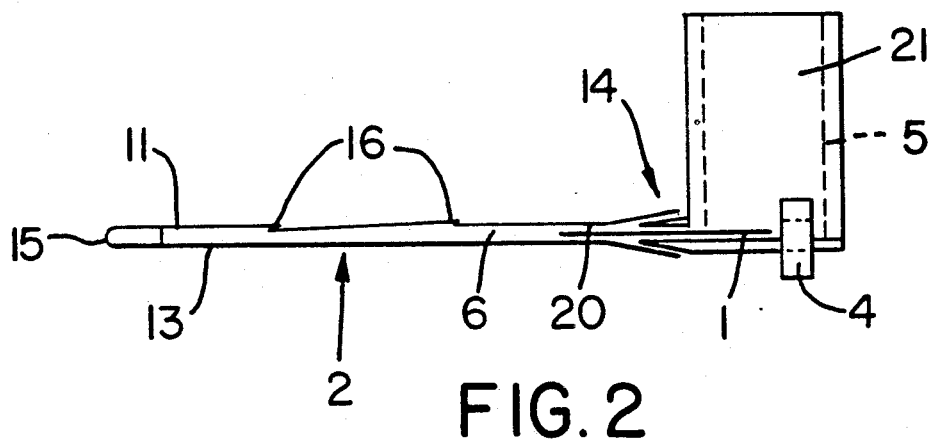
FIG. 2 is a sectional view of the film jacket according to FIG. 1 along the line A—A.

At the open side 14 of the film jacket 2 there is arranged a feeler 1 which is movable in longitudinal direction in the direction of the double-headed arrow 18. At the open side 14 of the film jacket 2, the feeler is moved in between the film layers 11, 12 (see FIG. 2). Instead of the linearly movable feeler 1 represented in the drawings there can also be provided a feeler which is pivotally movable around a point of rotation.

At its end moving into the film jacket 2, the feeler 1 has a wedge surface 19 interacting with the ends 20 of the weld seams 6, said ends 20 facing the open side 14 of the film jacket 2.

In carrying out the method of the invention, the slide frames 21 in the magazine 5 are successively pushed into the pocket 10 in direction of the arrow 22, said pocket 10 being located in front of the magazine 5. A pusher (not shown in the drawings) pushes the respective lowest frame 21 out of the magazine into the pocket 10. In this manner a total of three slide frames are inserted into the transverse pocket 10 until they have reached the position 17 indicated in FIG. 1 by a dotted line.

After filling said pocket 10 of the film jacket 2 is transported in the longitudinal direction 12 of the film until the next pocket 10 comes to face the magazine 5. The feeler 1 is used to control the process and provides exact positioning of the next pocket 10 to be filled. The film jacket 2 is transported in the longitudinal direction 12 of the film until the feeler 1 reaches the next weld seam 6 and actuates a switch 4. When the forward end 20 of the next weld seam 6 comes to contact the wedge surface 19 of the feeler 1, said feeler 1 is moved upwards in direction of the arrow 18 as a result of the interaction of the wedge surface 19 with the forward end 20 of the weld seam 6. Then the feeler can actuate the switch 4. For this purpose, the feeler 1 is preferably spring-loaded. The spring (not shown) tries to keep the feeler 1 in the position as shown in FIG. 1.

The feeler 1 can detect the side 23 of the transverse seam 6 leading in the transport direction 12 of the film. But it is also possible that the feeler 1 detects the side 24 of the transverse seam 6 trailing in the transport direction 12 of the film. The arrangement can for instance be chosen such that the feeler initially activates the switch 4 upon the upward movement in the arrow direction 28 caused by an interaction of the wedge surface 10 with the forward end 20 of the transverse seam 6 and then tips the switch 4 during the following downward movement in arrow direction 18 resulting from the spring load. In this case, the feeler 1 detects the trailing side 24 of the transverse weld seam 6.

Then the switch 4 interrupts the advancing of the film jacket 2 in the longitudinal direction 12 of the film in a mechanical, opto-electrical or any other form. Now the next pocket 20 is correctly positioned and can be filled.

During the scanning of the transverse seams 6 by the feeler 1, the forward side can be scanned as well as the trailing side of the weld seam. The end of the weld seam pointing to the open side of the film, i.e. the so-called small side of the weld seam, can have a semicircular form as represented in the drawings. But it can be acute in order to form a feeding funnel for the slide frames (or film strips). The "weld seam" can consist of two spaced apart parallel weld seams lying closely adjacent to each other. Very often these two weld seams are not connected. Then, as can be seen in the drawing, the feeler has to be designed such that it cannot be moved in between the two adjacent weld seams since then it would actuate the switch too early. In the embodiment as shown in FIG. 1 the front end 20 of the weld seams, facing the open side 14 of the film jacket 2, is shown with a rounded form. As is not shown in the drawings, the feeler 1 can for instance scan the "highest" point of the substantially semicircular rounding of the front end 20 of the weld seam 6, said point lying closest to the open side 14. The transverse seams 6 can for instance have an acute form at the front end 20 (also not shown in the drawings); then the feeler 1 can scan said point of the weld seam.

The present method is particularly advantageous because of the fixed distance of the feeler 1 to the magazine 5 (in longitudinal direction 12 of the film). Even varying weld seam distances always result in a correct positioning of the film jacket 2 in front of the filling magazine 5. It is a matter-of-course that the distance of the weld seams 6 in the longitudinal direction 12 of the film may not be smaller than the width of the slide frames to be filled therein.

The feeler 1 is movable in longitudinal direction (in the direction of the double-headed arrow 18), i.e. in a direction parallel to the direction of the transverse weld seams 6 and thus of the pockets 10 and in a direction perpendicular to the longitudinal direction 12 of the film. The switch 4 is arranged on the side of the feeler opposite the film jacket 2; thus there is an interaction with the end 2 of the feeler 1 opposite the wedge surface 19.

Figure 3:
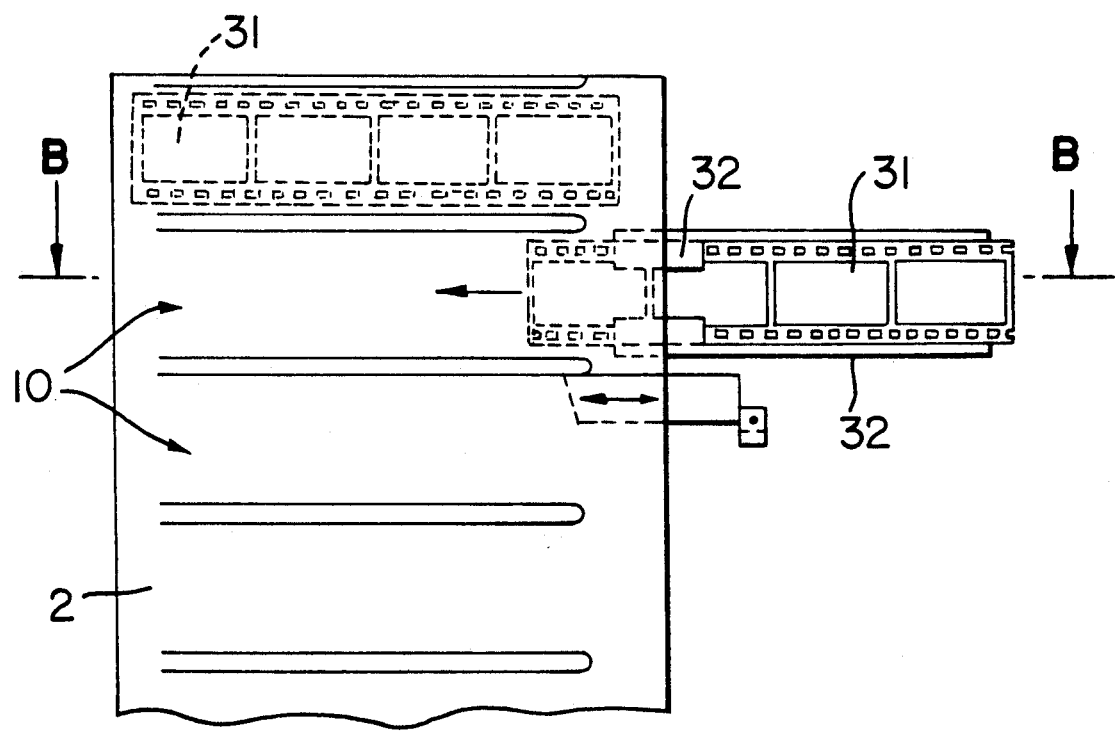
FIG. 3 is a top view of a film jacket in an apparatus for inserting film strips into the pockets of the film jacket, with a scanning device.

FIG. 3 shows a film jacket 2 in an apparatus for inserting film strips 31 in its transverse pockets 10. The film strips can be film strips which are not yet framed. These can be strips with several transparencies as well as strips with several negatives. In general, the film strips consist of four to six single pictures. The film strips can be cut in a known manner. They are introduced into the transverse pockets 10 via a track 32.

Figure 4:
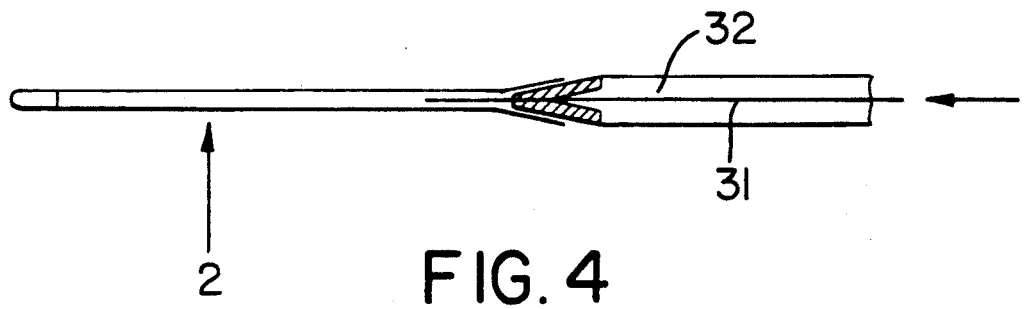
FIG. 4 is a sectional view of the film jacket according to FIG. 3 along line B—B.

FIG. 4 shows a sectional view along the line B—B of FIG. 3.

I claim:

1. Method of inserting slide frames (17, 21) or film strips (31) into pockets (10) of a two-layer film jacket (2) open on one side (14), wherein the pockets (10) are partitioned from each other by transverse seams (6), comprising successively inserting,
one or several slide frames (17, 21) or film strips into a pocket (10), and transporting
the film jacket (2) in the longitudinal direction (12) of the film to the next pocket (10) to be filled, the improvement comprising detecting the position of the next transverse seam during the transport of the film jacket (2) for the positioning of the next pocket (10) to be filled wherein the detecting of the position of the next transverse seam (6) is by a feeler (1).

2. Method according to claim 1, comprising moving the feeler (1) in between the film layers (11, 13) at the open side (14) of the film jacket (2).

3. Method according to claim 1 or 3, comprising detecting a side (23) of the transverse seam (6) which is the forward one in the transport direction (12) of the film by the feeler.

4. Method according to claim 1 or 3, comprising detecting a side (24) of the transverse seam (6) which is in the trailing one in the transport direction (12) of the film by the feeler.

5. Method according to claim 4, comprising detecting the transverse weld seams by the feeler.

6. Apparatus for inserting slide frames (17, 12) or film strips (31) into pockets (10) of a two-layer film jacket (2) which is open on one side (14) wherein the pockets (10) are partitioned from one another by transverse seams (6)
comprising
a means for pushing the slide frames (17, 21) or a film strip (31) into pockets (10) of the film jacket (2), and a transport means for the transport of the film jacket (2) and for the positioning of the next pocket (10) to be filled of the film jacket (2),
the improvement comprising
a scanning means (1, 4) for detecting the position of the transverse seam (6) of the next pocket (10) to be filled of the film jacket (2) during the transport of the film jacket (2) wherein the scanning means is a feeler (1).

7. Apparatus according to claim 6, wherein the feeler (1) can be moved in between film layers (11, 13) at the open side (14) of the film jacket (2).

8. Apparatus according to claims 6 or 8, wherein the feeler (1) can detect a side (23) of the transverse seam (6) which is the forward one in the transport direction (12) of the film.

9. Apparatus according to claims 6 or 8, wherein the feeler (1) can detect a side (24) of the transverse seam (6) being the trailing one in the transport direction (12) of the film.

10. Apparatus according to claim 6, wherein the feeler (1) is movable (18) in longitudinal direction.

11. Apparatus according to claim 6, wherein the feeler is pivotally movable.

12. Apparatus according to claim 6, wherein the feeler (1) has a wedge surface (19).

13. Apparatus according to claim 6, further comprising a switch means (4) which can be actuated by the feeler (1).

* * * * *